United States Patent [19]

Gaubatz

[11] Patent Number: 5,098,642
[45] Date of Patent: Mar. 24, 1992

[54] SYSTEM FOR IDENTIFICATION OF COMPONENTS

[75] Inventor: Donald C. Gaubatz, Cupertino, Calif.

[73] Assignee: General Electric Company, San Jose, Calif.

[21] Appl. No.: 408,972

[22] Filed: Sep. 18, 1989

[51] Int. Cl.⁵ .............................................. G21C 17/00
[52] U.S. Cl. ................................... 376/245; 376/261; 376/258; 376/450; 235/462
[58] Field of Search ............... 376/450, 452, 451, 245, 376/258, 261, 248, 249; 324/207.22, 226, 207.18; 235/462, 463

[56] References Cited

U.S. PATENT DOCUMENTS

| | | | |
|---|---|---|---|
| 3,066,969 | 12/1962 | Camac | 294/66 |
| 3,882,301 | 5/1975 | Nassimbene | 235/61.11 E |
| 3,964,967 | 6/1976 | Nelson | 176/80 |
| 4,347,622 | 8/1982 | Bernatowicz et al. | 376/245 |
| 4,625,396 | 12/1986 | Ahmed et al. | 29/701 |
| 4,665,369 | 5/1987 | Faller et al. | 324/326 |
| 4,822,987 | 4/1989 | Goldenfield | 235/462 |
| 4,847,474 | 6/1989 | Engel et al. | 235/464 |

FOREIGN PATENT DOCUMENTS

| | | |
|---|---|---|
| G21C1706 | 7/1970 | France . |
| 60-205354 | 3/1984 | Japan . |
| 1241287 | 8/1971 | United Kingdom . |
| 2073429A | 10/1981 | United Kingdom . |
| 2091931 | 8/1982 | United Kingdom . |

Primary Examiner—Brooks H. Hunt
Assistant Examiner—Chrisman D. Carroll
Attorney, Agent, or Firm—Robert R. Schroeder

[57] ABSTRACT

A method and apparatus for providing a permanent identification of reactor fuel assemblies with an in-reactor remote readout capability. A bar code type code assemblage is permanently coupled with the upper portion of the fuel assembly which is comprised of alternating components of magnetic and non-magnetic metal such as stainless steel. An active sensor including a magnetic core, excitation winding, and sensor or pickup winding is employed to interact with the individual code components of the bar code assembly. The latter assembly may be formed as a sequence of rings through which the sensor is passed during a grappling procedure or as a sequence of vertically-oriented bar segments positioned outwardly of the fuel assembly and readable by rotating the fuel assembly before the active sensor.

25 Claims, 6 Drawing Sheets

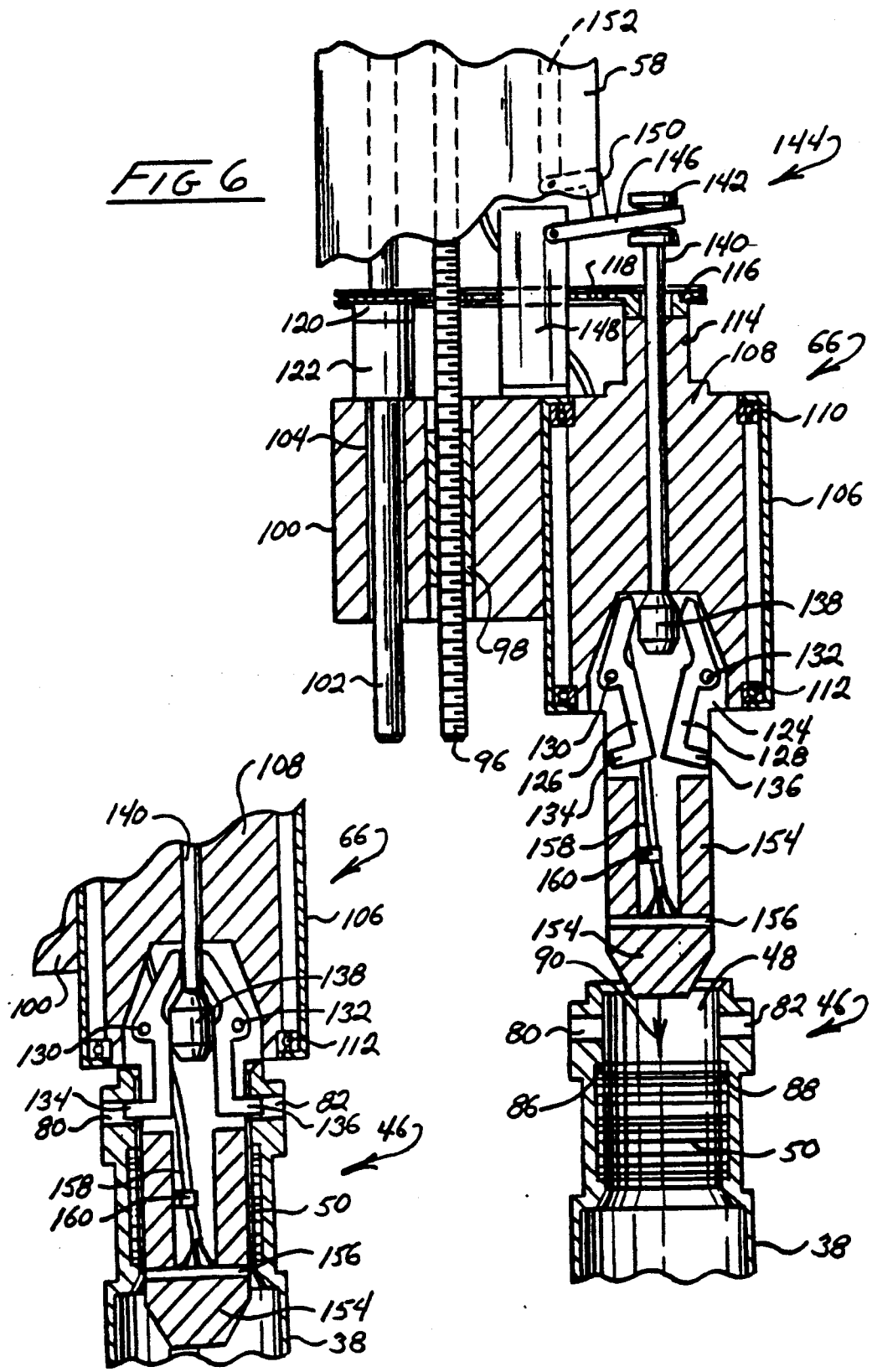

SYSTEM FOR IDENTIFICATION OF COMPONENTS

BACKGROUND OF THE INVENTION

Nuclear reactors structured for use by the power utilities industry are generally configured having a reactor core incorporating fuel in the form of bundled fuel rods or pins, control rods, internal radial blankets, shields and the like. From time to time, the fuel structures are replaced or reoriented by some form of remotely-controlled manipulative mechanism in order to maintain or optimize core performance. Requisite manipulation of the fuel assemblies and components may be carried out employing a variety of techniques, for instance, utilizing a fuel-in-vessel transfer machine (IVTM). For any such manipulation of fuel bundles or assemblies contemplated, however, a form of monitoring or tracking is called for such that the identity, history, position or location and orientation of the fuel assembly is always known. Heretofore, such tracking has been carried out by resorting to carefully maintained historical records or inventory data. This form of tracking may be subject to error and may inject time consuming inefficiencies the refueling process.

Over the recent past, investigators have undertaken the development of a modularized power system utilizing a somewhat standardized reactor module which may be fabricated at a factory location and then transported to a power facility site. The module thus developed was termed a "Power Reactor Inherently Safe Module" referred to by the acronym, PRISM. It is now known as the "Advanced Liquid Metal Reactor" referred to by the acronym ALMR.

In general, the below ground ALMR reactor is a compact pool type in which liquid sodium is circulated through the core by means of four cartridge-type electromagnetic pumps. Core produced heat is transferred from the hot primary liquid sodium via two intermediate heat exchangers performing with an isolated secondary liquid sodium component which is directed without the reactor vessel to a steam generator function. A cylindrical spent fuel storage region also is provided within the primary liquid sodium coolant above the reactor core which incorporates storage racks along its inner surface for carrying out a temporary storage of spent fuel bundles. This storage region also may include rotational devices for use in carrying out fuel bundle reorientation procedures, however, such fuel bundle rotational maneuvering also may be developed with the transfer mechanism itself. The spent fuel from a given cycle is stored at the noted storage region within the reactor and under the surface of the liquid sodium until a next refueling, allowing its decay heat to subside. When the spent fuel subsequently is removed, it then can be handled within inert gas which provides important savings in fuel facilities and fuel handling equipment. Of course, it is important that the fuel bundles positioned at the fuel storage location indeed represent properly spent fuel. Any tracking mistake in the selection of such bundles perforce will lead to an undesired overheating at the storage location, inasmuch as moderators otherwise present at the core region will not be present.

The fuel in-vessel transfer machine (IVTM) used with this reactor is called upon to operate within the primary liquid metal coolant, i.e. "under sodium" and is configured in the manner of a pantograph, the stationary leg of which is supported from a rotatable reactor vessel plug within the upwardly-disposed reactor closure assembly.

In view of the foregoing, it will be highly advantageous to incorporate within a reactor vessel, a capability for carrying out a remote positive identification and a determination of rotational orientation for fuel assemblies while beneath the liquid coolant within the active reactor environment. For facilities such as the ALMR reactor, this requires an "under sodium" identification of fuel assemblies. Such an identification technique will have broad application to conditions requiring tracking or readout within hostile environments, or where conventional codes are readily destroyed in the course of product usage. Environments which may be encountered will include, for instance, radio activity, gas, under-water and the like.

SUMMARY

The present invention is addressed to a system, apparatus and method for identifying components such as fuel assemblies while within a rigorous environment such as that of a nuclear reactor. Each fuel assembly is configured having a code carrying region, preferably located at its uppermost portion which normally is structured for coupling with the gripper or grapple of a fuel transfer machine. At the code carrying region, a predetermined sequence of magnetic and non-magnetic code components are permanently installed. These components may be formed, respectively, of magnetic stainless steel and non-magnetic stainless steel arranged in the manner of a bar code or the like. To read the code within the reactor environment of high temperature and a coolant such as liquid sodium, a relative motion is effected between the code region and an active scanner. This latter scanner may be configured having a magnetic core component along with an excitation winding functioning to generate magnetic flux which interacts with the code components within the code carrying region. Such interaction is sensed by sensing windings also located within the active scanner.

As another feature, the invention contemplates, in a nuclear reactor which includes a reactor vessel, a reactor core within the vessel containing discrete fuel assemblies, each with an upwardly disposed portion configured for association with a fuel transfer system having an engaging portion and wherein a liquid coolant is present within the reactor vessel, a fuel assembly identification system which comprises a predetermined code defining sequence of first and second magnetic code components fixed to the discrete fuel assemblies at a code carrying region thereof and uniquely identifying the fuel assembly to which the components are affixed when the code carrying region is scanned along a predetermined scan locus. An active scanner is provided for scanning the sequence of code components and is located within the reactor vessel within the coolant and includes a magnetic core component, an excitation winding mounted with the core component, and is energizable to generate electromagnetic flux therein. A sensing component is mounted with the core component and has an output signal when the magnetic core component is moved adjacent a magnetic code component effecting a completed magnetic flux circuit therewith. A readout circuit is provided for energizing the excitation winding and conveying each output signal in a code sequence thereof from the reactor vessel upon predetermined relative movement along the locus between the active scanner and the sequence of code components to derive a coded signal sequence corresponding with the fuel assembly unique identification.

Another feature of the invention provides, in a nuclear reactor having a reactor vessel, a reactor core within the vessel for receiving discrete elongate fuel assemblies, each having a longitudinal axis and an upwardly disposed engaging structure configured for transfer association with the engaging portion of a fuel transfer machine located within the reactor vessel, the vessel having a spent fuel storage region above the reactor core for receiving select fuel assembly transfer thereto by the fuel transfer machine and a liquid sodium coolant having a fuel level located above the spent storage region, the fuel assembly identification system which comprises a predetermined sequence of magnetic and non-magnetic code components formed as bar segments having lengthwise extents substantially parallel with the fuel assembly longitudinal axis and which are fixed to and outwardly disposed upon the discrete fuel assemblies at a code carrying region thereof and which uniquely identify the fuel assembly to which the code components are affixed and the orientation thereof about the axis when the code carrying region is scanned along a scan locus normal to the axis. An active scanner is mounted within the reactor vessel at a predetermined scan position and is configured including a magnetic core component, an excitation winding mounted with the core component, and energizable to generate electromagnetic flux therein, and a sensing component is mounted with the core component having an output signal when the magnetic core component is located adjacent a magnetic code component effecting a completed magnetic flux circuit therewith. A readout circuit is provided for energizing the excitation winding upon rotation of the select fuel assembly in an orientation providing operative juxtaposition between the scan locus and the active scanner, the circuit conveying each output signal from the reactor vessel for deriving a coded signal sequence corresponding with the fuel assembly unique identification.

Another feature of the invention provides a method for identifying discrete fuel assemblies while located within the reactor vessel of a nuclear reactor and under the surface of a coolant medium retained therein, which comprises the steps of:

fixing a predetermined sequence of magnetic and non-magnetic code components to each said discrete fuel assembly at a code carrying region thereof which uniquely identify the fuel assembly to which they are affixed when scanned along a predetermined scan locus;

providing an active scanner having a magnetic core component, an excitation winding energizable to generate electromagnetic flux within said core and a flux sensing component within said reactor vessel beneath said coolant medium surface;

scanning said sequence of code components by energizing said excitation winding while effecting relative movement along said scan locus between said magnetic core component in adjacency with said sequence of code components; and deriving a sequence of signal outputs from said sensing component corresponding with the completion of a magnetic circuit between said magnetic core component and said magnetic code components and corresponding with said predetermined sequence of code components.

Another feature of the invention provides a method for non-visually, remotely identifying an item of manufacture within an environment of non-magnetic fluid inaccessible to humans which comprises the steps of:

fixing a predetermined sequence of magnetic and non-magnetic code components to the item at a code carrying region thereof which uniquely identifies the item when the region is scanned along a predetermined scan locus;

providing a scanner having a magnetic component, an excitation winding energizable to generate electromagnetic flux, and a flux sensing component within the environment;

scanning the sequence of code within the environment by energizing the excitation winding while effecting relative and mutually adjacent movement along the scan locus between the scanner and the sequence of code components; and deriving a sequence of signal outputs from the sensing component corresponding with the completion of a magnetic circuit between the scanner magnetic component and the magnetic code components and corresponding with the sequence of code components.

A further feature of the invention provides, in a nuclear reactor wherein a fuel transfer machine having a grapple component is employed to engage a fuel assembly to carry out the maneuvering thereof and wherein an active scanner is provided having an excitation coil for generating magnetic flux, an improved fuel assembly which comprises an elongate body portion retaining a plurality of fuel rods extending between upper and lower ends. An engaging structure is coupled with the body portion at the upper end and is engageable with the grapple component. A predetermined code defining sequence of magnetic and non-magnetic code components are formed, respectively, of magnetic and non-magnetic materials fixed to the fuel assembly in the vicinity of the engaging structure at a code carrying region thereof and uniquely identify the fuel assembly when the code carrying region is scanned along a predetermined scan locus by relative movement with respect to the active scanner in a manner wherein the magnetic code components effect completion of a magnetic circuit with the excitation coil generated magnetic flux.

Another feature of the invention provides a method for non-visually, remote identifying an item of manufacture within an environment of non-magnetic fluid inaccessible to humans which comprises the steps of:

providing a scanner having a source of magnetic flux and a flux sensing component within said environment;

fixing a predetermined unique sequence of code components to the item at a code carrying region thereof, the code components being provided as first and second code components structured to respectively exhibit first and second levels of magnetic flux return when located within magnetic circuits formed with the source of magnetic flux;

scanning the sequence of code components within the environment by effecting relative and mutually adjacent movement of the scanner with respect to the code carrying region; and deriving a sequence of signal outputs from the sensing component corresponding with the formation of the magnetic circuits and with the unique sequence of code components.

Other advantages of the invention will, in part, be obvious and will, in part, appear hereinafter.

The invention, accordingly, comprises the apparatus, method and system possessing the construction, combination of elements, arrangement of parts and steps which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 6 is a partial sectional view of a grapple and pick-up leg component of a fuel transfer machine shown having components adjacent the code carrying handling socket of a fuel assembly;

FIG. 7 is a partial sectional view of the assembly of FIG. 6 showing an engagement between an active sensor and grapple with a code carrying fuel assembly;

DETAILED DESCRIPTION OF THE INVENTION

Figure 1:
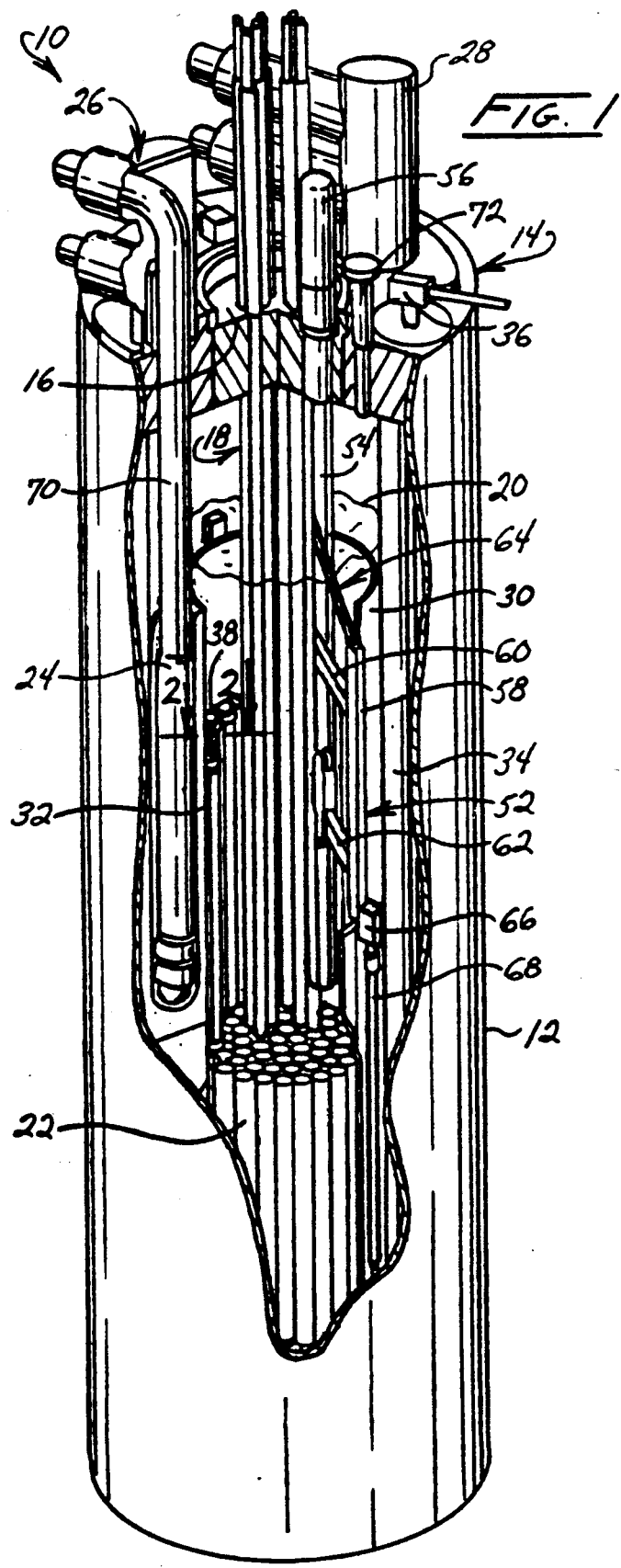
FIG. 1 is a perspective view of a reactor vessel incorporating features of the invention with portions broken away to reveal internal structure.
Figure 2:
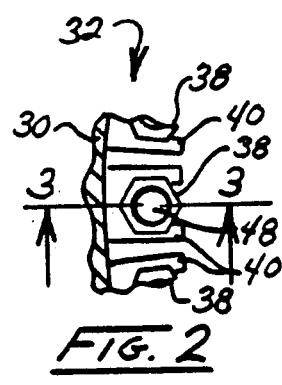
FIG. 2 is a partial top view of the spent fuel storage region of the reactor vessel of FIG. 1.
Figure 3:
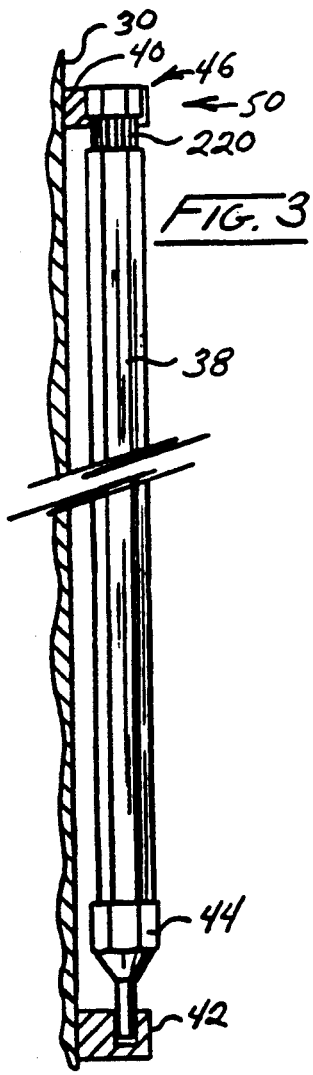
FIG. 3 is a partial sectional view taken through the plane 3—3 of FIG. 2.

Referring to FIG. 1 of the drawings, one reactor vessel assemblage which may be utilized within a power module is represented generally at 10. Schematized in the interest of clarity, the perspective representation of reactor 10 is seen to include a reactor vessel 12 having a reactor closure represented generally at 14 which includes a rotatable plug 16 supporting the upper internal structure 18 (UIS) of the reactor's control rod assemblage. Structure 18 is seen to extend downwardly from rotatable plug 16, thence through the upper level 20 of the liquid sodium coolant of the pool type reactor for control interaction with a reactor core 22. One intermediate heat exchange assembly (IHX) is shown at 24 representing a component of an intermediate heat transport system (IHTS) that provides a non-radioactive liquid sodium circuit connecting an intermediate heat exchanger with a steam generator (not shown). Conduits exiting from assembly 24 extend through an upwardly disposed housing 26. A similar housing 28 is associated with a second intermediate heat exchanger (not shown). A support cylinder and shield 30 is seen extending above the core 22 and is located inwardly and adjacent to the heat exchanger assembly 24. Support cylinder 30 is located below the liquid sodium level 20 and inwardly disposed thereon is a fuel assembly storage position 32 which, per force, also is below the liquid sodium surface 20. Also communicating with the upper assembly 14 are electromagnetic pumps, components of one of which is revealed at 34. Pumps as at 34 function to circulate the primary liquid sodium in the reactor 10 to effect an efficient heat exchange and cooling function. The fuel assembly storage position 32 is seen to retain or store spent fuel from one cycle within the reactor 10 until a next refueling, its position within the liquid coolant allowing its decay heat to subside. Such stored fuel bundles or assemblies are represented at 38 as stored along the inward surface of support shield 30 at storage position 32. Looking additionally to FIG. 2, the stored fuel bundles are represented as being positioned and retained at U-shaped upper brackets 40 against the inward wall of support cylinder 30. FIG. 3 reveals an entire assembly 38 as coupled with the upper bracket 40 and seated supportively in a lower bracket 42 by insertion of a nose component 44 therewithin. The hexagonal fuel bundle generally will be designed having a body portion extending between upper and lower ends and carrying a plurality of fuel rods containing reactor fuel. Such fuel bundles or assemblies are manipulated from an upwardly-disposed portion 46 configured as an engaging structure or handling socket which associates with a fuel in-vessel transfer machine (IVTM). In this regard, FIG. 2 shows that the handling socket of each fuel bundle 38 includes an upwardly disposed internal access channel or chamber 48. Also revealed at FIG. 3 is a code carrying region 50 structured having a code component assemblage 220 in accordance with one embodiment of the instant invention.

Returning to FIG. 1, the in-vessel transfer machine (IVTM) is represented generally at 52 and includes a main tube 54 which is seen extending through and supported from rotatable plug 16 and which is actuated from a motorized rotational drive represented generally at 56. Machine 52 is structured in the manner of a pantograph and includes a pick-up leg 58 as well as pantograph linkages as at 60 and 62. Main tube 54 is maneuverable both by virtue of the rotation of plug 16 as well as vertically by telescopic action generated from drive assembly 56. The tube also supports a rotational drive mechanism represented generally at 64 for providing necessary mechanical input drive into pick-up leg 58 for use, in connection with vertically movable grapple 66 positioned at the lowermost region thereof. Grapple 66 is shown coupled with the handling socket of a fuel assembly represented in the figure at 68. Also shown in FIG. 1 is a readout station or scanner assembly 70 located beneath the coolant surface level 20 in the upper region of reactor 10. In general, scanner 70 is at the level of stored fuel, for example, occupying one stored fuel position. Finally, a transfer station or plug is represented at 72 which is utilized in connection with the maneuvering of fuel assemblies into and out of reactor 10.

Figure 4:
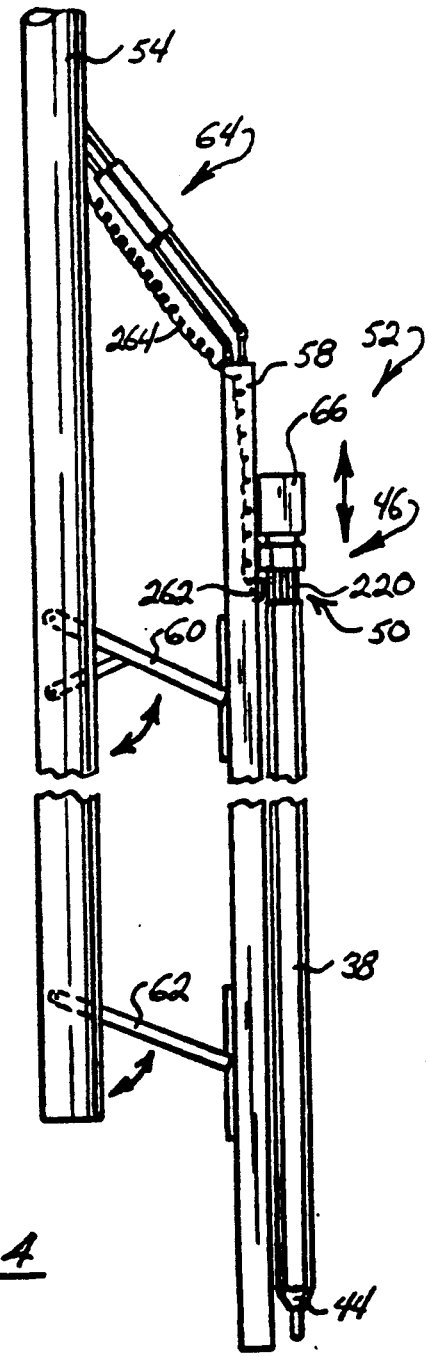
FIG. 4 is a partial plan view of a fuel transfer mechanism employed with the reactor vessel of FIG. 1.

Looking to FIG. 4, the fuel transfer machine 52 is represented in isolated, broken away fashion. In this regard, the device is shown in an orientation wherein grapple 66 has engaged a fuel assembly 38 and has been maneuvered upwardly on tube 58. Pantograph linkages 60 and 62 are actuated in a compound manner to provide for the horizontal or in and out maneuvering of pick-up tube 58 and its associated grapple 66. Main tube 54 is telescopically actuable for vertical movement and the entire assemblage is movable in conjunction with rotatable plug 16. The grapple 66 is vertically movable along pick-up leg 58 as well as operable to engage and rotate fuel assemblies by select actuation of the linkages 64. In the illustration of FIG. 4, the grapple 66 is shown at its uppermost station.

Figure 5:
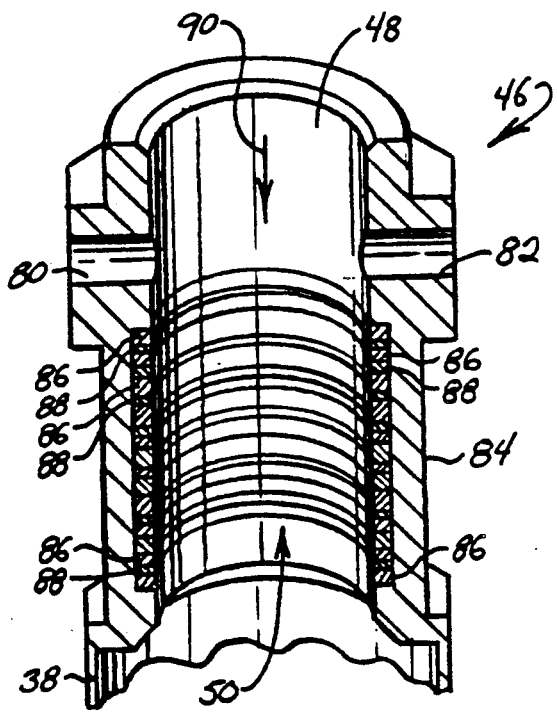
FIG. 5 is a partial perspective view of a handling socket component of a fuel assembly incorporating a code carrying region according to the invention.

Turning to FIG. 5, the upwardly disposed portion 46 of a fuel assembly 38 is represented in conjunction with an initial embodiment of the invention. This upper region 46 provides a handling socket for the components at grapple 66 and, in this regard, the internal access channel or cavity 48 is seen to be of cylindrical form and functions as the female component of a handling socket structure. In the latter regard, this handling socket structure includes two oppositely disposed finger receiving channels 80 and 82 below which a cylindrical collar structure 84 is provided, the cylindrical internal surface of which functions as the code carrying region 50. Region 50 for the instant embodiment is formed as a sequence of ring-shaped magnetic and non-magnetic code components, the widths of which are selected in accordance with a bar code identification scheme to provide a unique identification, such as a serial number of the fuel assembly 38 to which they are attached. The code employed may be selected in accordance with the desires of the designer. In general, such codes are in binary format, being formed commencing with start bits and check sum bits, followed by a sequence of data or identification bits and terminating with parity and stop bits. The materials employed for the ring components may be non-magnetic stainless steels such as types 302-304 for non-magnetic components and magnetic stainless steel for the magnetic component. This alternating sequence is readable on a binary basis where the reactor coolant is itself non-magnetic, albeit electrically conductive, such as liquid sodium or water. In FIG. 5, certain of the magnetic ring components are represented as at 86, while certain of the non-magnetic ring components are represented at 88. The assembly of code component 50 is "read" by using a scanner to scan for the presence or absence of a magnetic material along a locus parallel with the axis of bundle 38 as represented at arrow 90. A variety of scanning arrangements can be contemplated by the invention. For example, both active and passive scanning techniques can be employed, active approaches being described in the discussion which follows. However, the code region can be made up of elements of alternating high and low resistivity sensed by contact or non-contact such as Eddy current techniques and the like. Where magnetic flux and a flux sensor are contemplated with a passive readout, the requisite flux can be developed from a permanent magnet or electromagnet, and the sensing element can be provided as a coil of wire placed in the magnetic flux field along with a relative movement effecting a modulation of the magnetic field and an induced electric current to the coil. A d.c. flux sensitive approach may be employed based upon flux gating, Hall effect, magneto-resistive or like approaches. In effect, a non-contact readout is achieved in a hostile environment. For the noted passive scanning technique, by moving the permanent magnetic materials out of the immediate reactor core environment, for example to upwardly disposed storage region or UIS 18, then the material may be selected to reach a temperature below its Curie point or the temperature of transition above which the phenomena of ferromagnetism disappears and substances become merely paramagnetic.

Referring to FIG. 6, the mechanism for effecting engagement between grapple 66 and engaging portion 46 of fuel assemblies as at 38 is illustrated. Pick-up leg 58 is seen to incorporate a grapple elevation drive rod 96 which is threadably engaged with a threaded bushing 98 mounted within a carriage 100. Rotational movement of drive rod 96 will impart corresponding vertical movement to carriage 100 of the grapple 66. Positioned in parallel adjacency with rod 96 is a grapple body rotation drive rod 102 shown extending through a bore 104 within carriage 100. Both rods 96 and 102 are driven from linkages 64 (FIG. 4). Fixed to carriage 100 is a grapple body housing 106 within which a rotatable grapple body 108 is mounted. Body 108 is configured for rotatable support by spaced bearings 110 and 112. The upwardly disposed portion of grapple body 108 is shown formed into a cylindrical collar 114 which, in turn, is fixed to a sprocket 116. Sprocket 116, in turn, is drivably coupled by a chain drive 118 extending, in turn, to a corresponding sprocket 120 fixed, in turn, for drivable rotation from rod 102 through connection with a collar-spacer 122.

The rotatable grapple body 108 is configured having a slot shaped chamber or cavity 124 formed therein which functions to retain two oppositely-disposed engaging members 126 and 128. Members 126 and 128 are, in turn, pivotally mounted within cavity 124 at respective pivot points 130 and 132, and are seen to be configured at their lowermost extents to provide mutually outwardly disposed engaging fingers shown, respectively at 134 and 136. Fingers 134 and 136 are represented in the drawing in their retracted orientation by virtue of the positioning of a cam 138 at its uppermost location within cavity 124. Cam 138, in turn, is connected by a rod 140 to a spool retainer 142 forming part of an actuating mechanism represented generally at 144. In this regard, the mechanism 144 includes a drive link 146 which is pivotally mounted to an upstanding support 148 fixed, in turn, to carriage 100. Drive link 146 is seen coupled to an elbow link 150 which, in turn, is pivotally connected to a grapple actuator rod 152. Thus, upon vertical movement of rod 152, the finger actuating mechanism 144 is moved to position cam 138 and, in turn, position fingers 134 and 136 in either retracted or extended orientations. Additionally, by select rotation of drive rod 102, the grapple body component 108 may be rotated to select orientations. Grapple body 108 is shown having an elongate and cylindrically shaped grapple head 154 which is configured for removable and nestable insertion within internal access channel 48 of the handling socket of a given fuel assembly 38. Head 154 also supports an active scanner or sensor 156 which serves to interact with the coded array of magnetic and non-magnetic rings 86 and 88 of code carrying region 50 upon movement of the grapple head therewithin along the earlier-described locus defined by arrow 90. Electrical communication with the active scanner 156 is by a shielded and protected cable 158 shown retained within the head 154 by a bracket 160.

With the arrangement shown, during a procedure wherein fuel assembly 38 is engaged by the grapple 66, grapple head 154 is moved downwardly within channel 48, and during such movement, the active sensor 156 determines the presence and the absence of magnetic or non-magnetic ring components 86 and 88, providing a corresponding binary designated output signal when passing before a magnetic ring component 86 and having no such signal or a signal of diminished amplitude when passing a non-magnetic ring component 88. A resultant serial binary coded signal then is transmitted via cable 158 to readout circuitry.

Looking to FIG. 7, the position of grapple head 154 following full insertion within the channel 48 is depicted. Following full insertion, rod 152 is actuated to, in turn, lower cam 138 and cause the pivotal movement of components 126 and 128 to, in turn, effect the engagement of corresponding fingers 134 and 136 within respective finger receiving channels 80 and 82. With engagement thus completed, the grapple 66 is capable of maneuvering the fuel assembly 38 about the reactor 10 and, additionally, by virtue of the drive imparted from rod 102, rotate the fuel assembly 38 to the extent desired.

Figure 8:
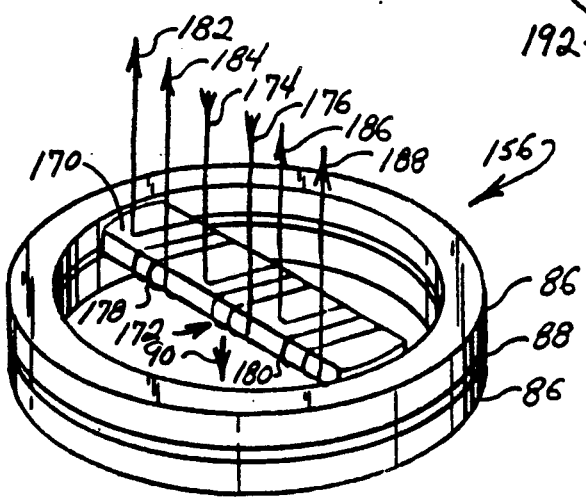
FIG. 8 is a partial perspective view of a portion of a code assembly and active sensor according to the invention.

Turning to FIG. 8, one structure for the active sensor 156 is revealed in perspective fashion in conjunction with three code component rings in the sequence labeled 86, 88, and 86. Because of the high temperature environment of the reactor 10, the use of permanent magnetic material for components 86 is precluded. Accordingly, an active device 156 is employed herein shown as including a magnetic core component fashioned as a bar 170 having a length permitting it to be moved with grapple head 154 such that its curved ends are in close adjacency with the internally disposed surfaces of the components 86 and 88. Magnetic flux is generated within the core component 170 by an excitation winding 172 which is excited from leads 174 and 176. Accordingly, upon the excitation of leads 174 and 176, a flux is generated within core 170 which couples with the magnetic material core components 86 and returns by the thus-established magnetic circuit into core 170. This return or completed magnetic circuit is detected by pick-up or sensor coils 178 and 180 by virtue of the current inductively generated therein and the signal outputs then are provided for coils 178 at leads 182 and 184 and for coil 180 at lead 186 and 188. The voltage amplitude and frequency of resultant output signals depends upon the strength of the magnetic flux generated by the input drive current from leads 174 and 176 as well as upon the relative motion or velocity of the sensor 156 moving along the locus 90. By employing an alternating or pulse drive current at leads 174 and 176, a sensor output which is independent of motion along locus 90 is achieved.

The performance of such sensors as discussed in conjunction with FIG. 8 can be improved by the addition of cores or pole pieces as well as excitation and sensing coils. For example, a cross-shaped pole may be employed with windings on each leg, one pair of oppositely disposed windings being employed as a sensor and the oppositely-disposed pair of windings being for the purpose of excitation.

Figure 9:
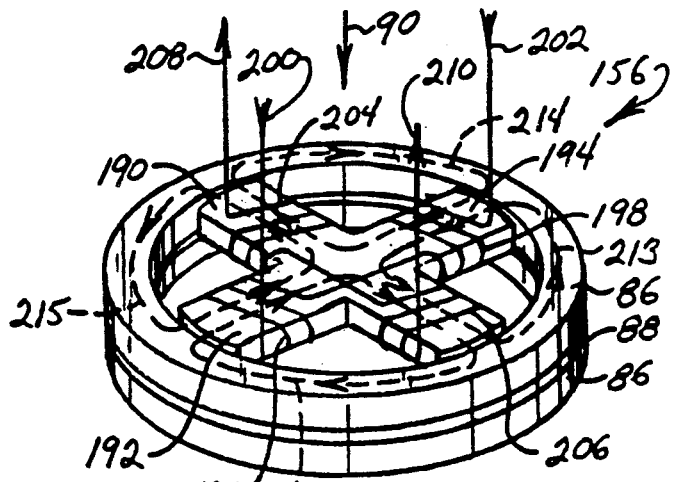
FIG. 9 is a partial perspective view of another portion of a code carrying assemblage and an active sensor according to the invention.

Referring to FIG. 9, a cross-shaped core is represented generally at 190 in conjunction with three code component rings in the sequence 86, 88, and 86. Core 190 may be considered to include two intersecting legs of magnetic material as represented at 192 and 194. An excitation winding 196 is wound about one side of core leg 192 in a given polar or winding sense, which is continued and would about the opposite side of leg 192 but in an opposite winding or polar sense as at 198. Leads extending to a control circuit for effecting excitation are shown at 200 and 202. Correspondingly, a sensor winding 204 is wound having a given winding or polar sense about one side of core leg 190 and is seen to continue and to be wound at 206 about the opposite end of that core leg. The sensing output leads for windings 204 and 206 are seen at 208 and 210. With this form of differential winding, upon excitation, reinforced magnetic flux paths represented by arrows 212-215 are developed as the sensor approaches a magnetic code component as at 86. Of particular advantage, through the utilization of a differential form of winding, stray magnetic flux which may be encountered by the sensor is, in effect, cancelled while, under excitation, the differentially connected sensing coil enjoys an additive form of magnetic flux circuit.

Figure 11:
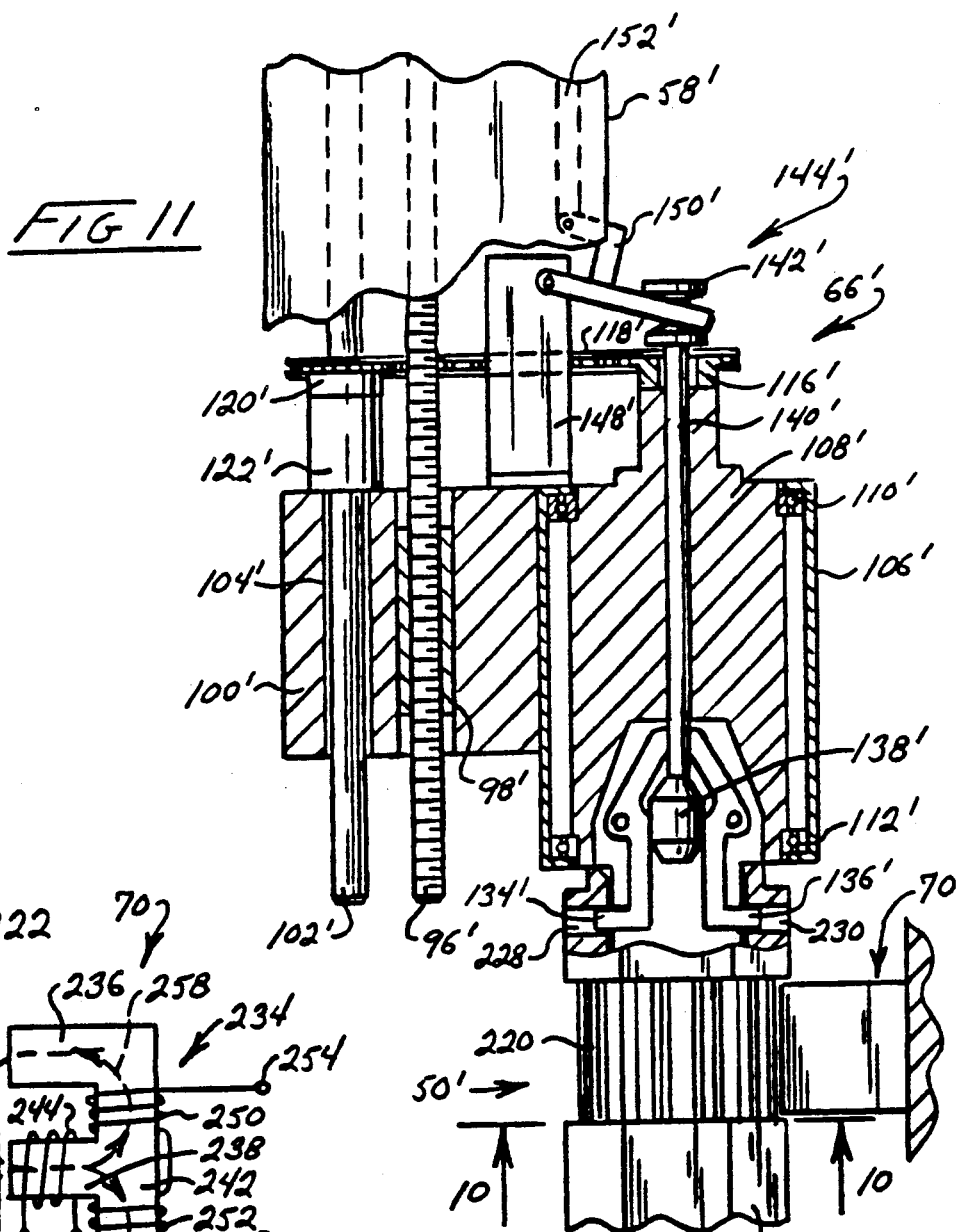
FIG. 11 is a partial perspective view showing a pick-up leg and grapple of a fuel transfer machine in operative association with the handling socket of the fuel assembly incorporating the code component assemblage of FIG. 10 and in adjacency with a reactor vessel mounted active sensor.
Figure 10:
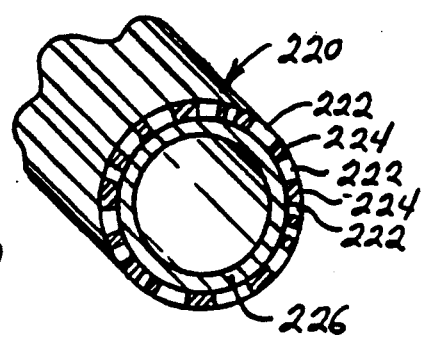
FIG. 10 is a partial perspective view showing another embodiment of a code component assembly according to the invention.

In addition to the positive identification of each fuel assembly 38 provided by the identification heretofore described, it further is desirable to retain a capability of determining the instantaneous orientation of the assemblies 38 about their longitudinal axes. Referring to FIG. 10, a code component assemblage 220 is revealed which is formed of elongate bar segments. Certain of these bar segments, for example as at 222, are fashioned of magnetic material, while intermediate segments, certain of which are shown at 224, are formed of non-magnetic material, for example, segments 222 and 224 may be formed, respectively, of magnetic and non-magnetic stainless steel as before. The assemblage 220 is fixed upon the cylindrical portion 226 of the handling socket of the upwardly disposed portion of assemblies as at 38. Looking to FIG. 11, the assemblage of bar code components 220 is seen positioned at the upper portion of fuel assembly 38. In the figure, those components of the grapple and pick-up leg 58 of the in-vessel transfer machine (IVTM) 52 again are reproduced with the same numeration set forth at FIG. 6 but in primed fashion. Fingers 134' and 136' are shown extended and thus inserted within the respective passageways 228 and 230 of the handling socket component 230 just above the bar code component assemblage 220. Assemblage 220 is shown at the code carrying region 50' of fuel assembly 38 and the grapple assemblage 66' is depicted having maneuvered the code assemblage 220 into reading adjacency with readout station or scanner 70, as represented in FIG. 1, being positioned at the spent fuel storage region of the reactor 10. By carrying out a rotational drive at rod 102', a corresponding rotation of grapple body 108' will, in turn, effect the rotation of fuel assembly 38 and the code assemblage 220 before scanner or readout station 70. A particularly desirable positioning for the scanner or reader station 70 is at a fixed location at the Upper Internal Structure (UIS) 18. Assemblage 18 rotates with the fuel in-vessel transfer machine (IVTM). So positioned, the rotatable plug 16 would not have to be rotated each time a readout is desired. Further, no flexible wiring is required for operating scanners as at 70 when so located.

Figure 12:
FIG. 12 is a schematic representation of an active sensor embodiment according to the invention.

Looking to FIG. 12, a preferred active scanner structuring for use with code assemblages as at 220, i.e. for station 70 is represented. In the figure, a bar code segment of magnetic material from assemblage 220 is represented, as before, by the numeral 222, in operative adjacency with the core and winding component configuration for scanner station 70. Magnetic core 234 is E-shaped having a top leg 236, a middle leg 238, a bottom leg 240, and a back leg 242. Legs 236, 238, and 240 are seen to be substantially parallel; are vertically aligned so as to mutually react with each bar code segment as at 222; and are mutually spaced from the rear or back leg portion 242. An excitation winding 244 having leads 246 and 248 is wound about the centrally disposed leg 238, while the sensing component includes one sensor winding of a given polar sense 250 wound about rear leg 242 intermediate legs 236 and 238 and a commonly connected winding 252 which is wound in an opposite polar sense and leg 242 intermediate legs 238 and 240. The sensing output leads for the arrangement are represented at 254 and 256. With the arrangement shown, differentially wound and coupled coils 250 and 252 will tend to mutually react to cancel stray magnetic flux originating from outside of the scanning region, while the positioning of excitation winding 242 at middle leg 238 achieves a reinforced flux generation as represented by the magnetic circuit paths 258 and 260.

With the active scanning technique shown, the rotational orientation of the fuel assemblage 38 advantageously may be determined by code readout. Additionally, direct current excitation may be employed with respect to the excitation winding 244, signal voltages being generated in sensor coils 250 and 254 then being dependent upon the rate of change of magnetic flux (d$\phi$/dt). However, because of the necessarily long lead lengths for sensor outputs 254 and 256 to instrumentation vaults within reactor facilities, electrical noise may be encountered. Thus, an alternating or pulse current excitation for coil 244 may be of advantage from the standpoint of developing adequate signal-to-noise performance. In this regard, the sensing system utilizing a select a.c. input can employ a narrow band filter for noise limitation as well as a synchronous detection approach for readout purposes.

As is apparent, the instant apparatus and method of identification finds application in harsh environments where visual techniques as may be involved in conjunction with video scanners, laser devices and the like would not be available. Where the high temperatures of a nuclear reactor are not involved, for example within poisonous gas, high dust, oil, down hole oil well situations or undersea environments, then an electrical excitation technique for generating magnetic flux may not be called for. Within such environments, a permanent magnet material may be provided either for the code components themselves or for the scanning equipment.

Returning to FIG. 4, another scanning arrangement for the collar form of code assemblages as at 220 is revealed. In this regard, it may be noted that an active scanner 262 is mounted upon pick-up tube 58 at a location selected such that the grapple 66 may maneuver fuel assembly 38 to the orientation shown permitting active scanning. For this embodiment, a cable input such as the coiled cable 264 is required. This arrangement is particularly useful where grapples having rotatable grapple bodies 108 are employed. For non-rotating grapple structures, then another form of motive input located, for example, in the vicinity of active scanner 70, is required to carry out rotation of the fuel assemblies for scanning purposes. As noted above, particular advantage accrues from the use of a fixed station as at 70, whether located as shown or at upper internal structure (UIS) 18, for scanning and related activities such as rotation of the fuel assembly. In this regard, the electrical cabling may be of simpler design inasmuch as it is not called upon to flex during the fuel transfer machine maneuvering activities.

Figure 13:
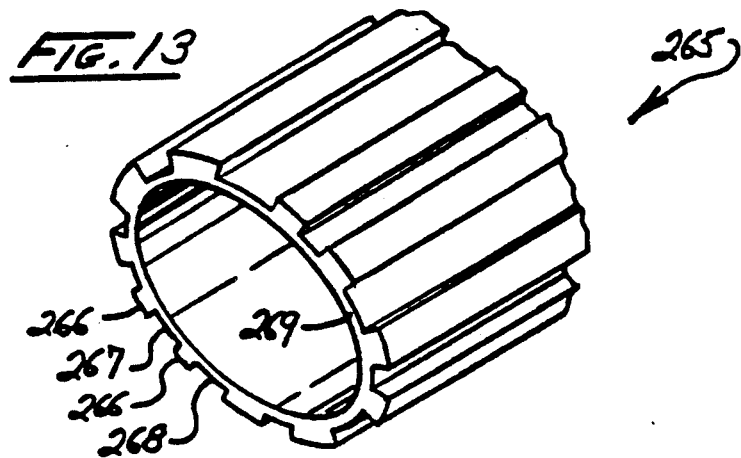
FIG. 13 is a partial perspective view showing another embodiment of a code component assembly according to the invention.

Referring to FIG. 13, a code component assemblage 265 is revealed which is formed of elongate bar segments 265 somewhat in the manner of assemblage 220 described in conjunction with FIG. 10 above. However, with assemblage 265, all of the code components represented by bar segments are formed of, for example, a magnetic material but are fashioned having a gear tooth arrangement wherein certain of the bar code components will be closer to the scanner than others to derive a variation of flux circuit communication during scanning. An advantage accrues with this type of code formation in that variations in heights of the code components may provide for codes other than binary. For example, a ternary coding may be provided using three heights as are represented at code components 266, 267, and 268 in the figure. By looking to a trinary form of coding, a greater number of identifying values may be derived with a given number of bar segments. Where the extent of a code carrying region is limited, resort to such an arrangement will have advantage. Another aspect for this multi-level form of code component formation resides in the development of a positive signal level for bits of a code whether binary or ternary. Such an arrangement avoids discrepancies sometimes referred to as "false negative" indications. The assemblage 265 is fixed upon the cylindrical portion 226 of the handling socket of the upwardly disposed portion of assemblies as at 38.

Figure 14:
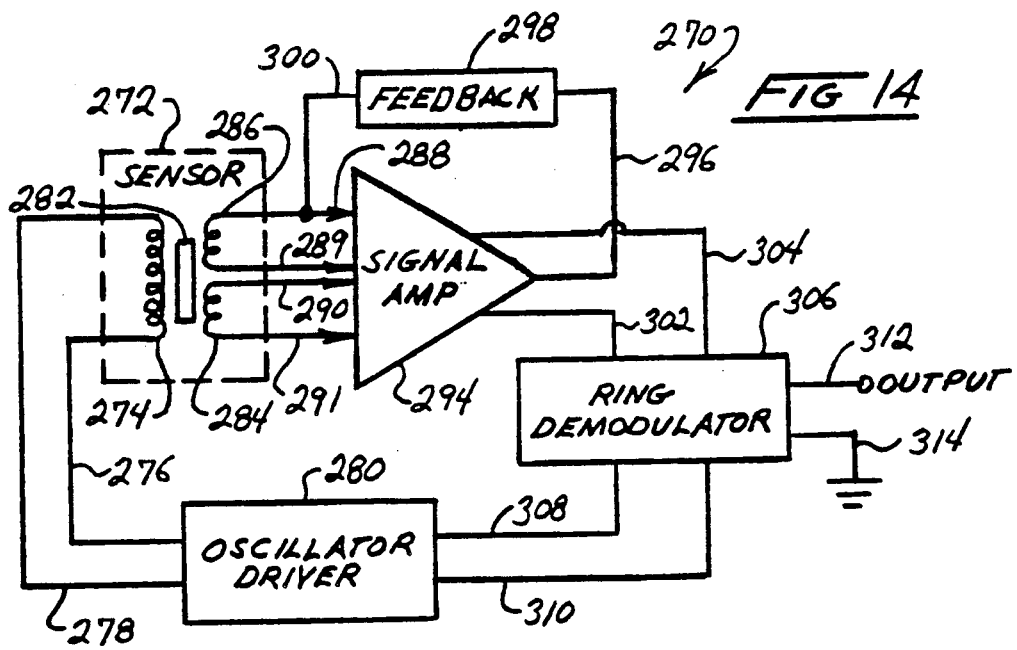
FIG. 14 is a block schematic diagram of an active sensor signal treatment circuit according to the invention.

Referring to FIG. 14, a readout circuit which may be employed with the fuel assembly identification system is represented generally at 270. A sensor is schematically depicted within dashed boundary 272 as including an excitation winding 274 which is activated by leads 276 and 278 from an oscillator/driver 280. Magnetic material including that of a core component and associated code component is represented at block 282 and two separate sensor windings are represented at 284 and 286 having output leads 288-291 directed to the input of a signal amplification stage 294. A conventional feedback path is provided as represented by lines 296, block 298, and line 300. The amplified signal outputs from stage 294 are presented at lines 302 and 304 being directed to one input of a synchronous demodulator represented at block 306. A reference signal from oscillator driver 280 is provided to the demodulator 306 as represented at lines 308 and 310, such that the demodulator 306 may compare the differential signals at lines 302 and 304 against the oscillator derived reference signals at lines 308 and 310 to produce an output as at line 312 representing the presence or absence of magnetic material at the bar code components. A ground to the system is represented at line 314.

Figure 15:
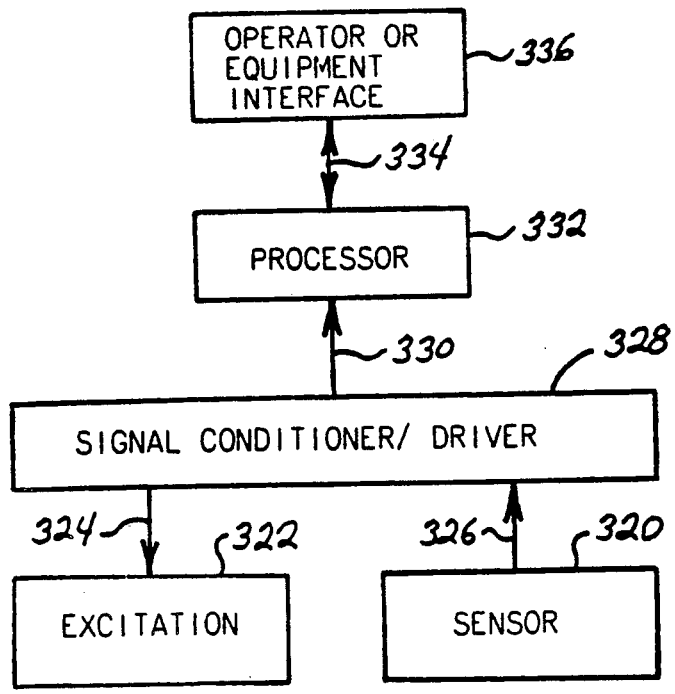
FIG. 15 is a block schematic diagram of a control circuit according to the invention.

Referring to FIG. 15, a general block diagrammatic representation of the readout circuit is set forth. In the figure, the excitation winding function is represented at block 322 as being driven, as represented by line 324 from a signal conditioner/driver circuit 328. In similar fashion, the sensor function is represented at block 320 as having a signal input via line 326 to the signal conditioner function of circuit 328. The resultant conditioned, serialized and binary form signal then is directed as represented by line 330 to the input/output port of a processor as represented at block 332. The processor may then provide interactive communication as represented at line 344 with an operator interface as represented at block 336. The latter interface may be provided as a conventional computer terminal station. Alternately, communication may be carried out with an automated control system without an operator interface.

Since certain changes may be made in the above-described system, apparatus and method without departing from the scope of the invention herein involved, it is intended that all matter contained in the description thereof or shown in the accompanying drawings shall be interpreted as illustrative and not in a limiting sense.

I claim:

1. In a nuclear reactor having a reactor vessel, a reactor core within said vessel containing discrete fuel assemblies each with an upwardly disposed portion configured for association with a fuel transfer system having an engaging portion and a liquid coolant within said vessel, fuel assembly identification system, comprising:
   a predetermined code defining sequence of first and second magnetic code components of different magnetic response fixed to said discrete fuel assemblies at a code carrying region thereof and uniquely identifying the said fuel assembly to which said components are affixed when said code carrying region is scanned along a predetermined scan locus;
   an active scanner for scanning said sequence of code components, located within said reactor vessel within said coolant, including a magnetic core component, an excitation winding mounted with said core component and energizable to generate electromagnetic flux therein, and a sensing component mounted with said core component and having an output signal when said magnetic core component is moved adjacent to said magnetic code component effecting a completed magnetic flux circuit therewith; and
   a readout circuit for energizing said excitation winding and conveying each said output signal in a code sequence thereof from said reactor vessel upon predetermined relative movement along said locus between said active scanner and said sequence of code components for deriving a coded signal sequence corresponding with said fuel assembly unique identification.

2. The identification system of claim 1 in which:
   said first magnetic code components are formed of magnetic stainless steel; and
   said second magnetic code components are formed of non-magnetic stainless steel.

3. The identification system of claim 1 in which:
   said magnetic code components are ring-shaped and mutually arranged to provide said code carrying region as a cylinder having an internal access channel extending therethrough for receiving said fuel transfer system engaging portion; and
   said code carrying region is located at said fuel assembly upwardly disposed portion; and
   said active scanner is mounted upon said fuel transfer system engaging portion.

4. The identification system of claim 3 in which:
   said active scanner magnetic core component is a bar of magnetic material extensible within said internal access channel;
   said excitation winding is wound about said bar at a substantially central position thereon; and
   said sensing component includes a winding wound about said bar outwardly of said excitation winding.

5. The identification system of claim 3 in which:
   said active scanner magnetic core component includes first and second intersecting legs of magnetic material joined in magnetic flux communication;
   said excitation winding includes a first excitation winding wound about one end of said first leg and a second excitation winding wound about the opposite end of said first leg in a polar sense opposite to that of said first excitation winding;
   said sensing component includes a first sensor winding wound about one end of said second leg and a second sensor winding wound about the opposite end of said second leg in a polar sense opposite to that of said first sensor winding.

6. The identification system of claim 1 in which said magnetic code components are formed as bar segments of given lengthwise extent mutually arranged to provide said code carrying region as a cylinder having a cylinder axis, said lengthwise extent of each said code component being substantially parallel with said cylinder axis.

7. The identification system of claim 6 in which:
   said active scanner magnetic core component comprises an E-shaped core having top, bottom and centrally disposed substantially parallel, vertically aligned and mutually spaced legs extending substantially equidistantly from a rearwardly disposed bar portion;
   said active scanner excitation winding is wound about said centrally disposed leg;
   said sensing component includes a first sensor winding wound about said bar portion intermediate said top and centrally disposed legs, and a second sensor winding wound about said bar portion intermediate said bottom and centrally disposed legs in a polar sense opposite to that of said first sensor winding.

8. The identification system of claim 6 in which said active scanner is mounted upon said fuel transfer system at a location wherein said code carrying region is movable by said fuel transfer system into said reading adjacency therewith.

9. The identification system of claim 6 in which:
   said first magnetic code components are formed of magnetic stainless steel; and
   said second magnetic code components are formed of non-magnetic stainless steel.

10. The identification system of claim 6 in which said bar segment code components are arranged and selected to permit an identification of the orientation of said fuel assembly with respect to said cylinder axis.

11. In a nuclear reactor having a reactor vessel, a reactor core within said vessel for receiving discrete, elgonate fuel assemblies, each having a longitudinal axis and an upwardly disposed engaging structure configured for transfer association with the engaging portion of a fuel transfer machine located within said reactor vessel, said vessel having a spent fuel storage region above said reactor core for receiving select said fuel assemblies transferred thereto by said fuel transfer machine, and a liquid sodium coolant having a fluid level located above said spent fuel storage region, the fuel assembly identification system comprising:

a predetermined sequence of magnetic and non-magnetic code components formed as bar segments having lengthwise extents substantially parallel with said fuel assembly longitudinal axis, fixed to and outwardly disposed upon said discrete fuel assemblies at a code carrying region thereof and uniquely identifying the fuel assembly to which said code components are affixed and the orientation thereof about said axis when said code carrying region is scanned along a scan locus normal to said axis;

an active scanner mounted within said reactor vessel at a predetermined scan position including a magnetic core component, an excitation winding mounted with said core component and energizable to generate electromagnetic flux therein, and a sensing component mounted with said core component and having an output signal when a said magnetic core component is located adjacent a said magnetic code component effecting a completed magnetic flux circuit therewith; and a readout circuit for energizing said excitation winding upon rotation of said select fuel assembly in an orientation providing operative juxtaposition between said scan locus and said active scanner, said circuit conveying each said output signal from said reactor vessel for deriving a coded signal sequence corresponding with said fuel assembly unique identification.

12. The identification system of claim 11 including a fuel assembly rotator mounted with said reactor vessel in the vicinity of said scan position for effecting the rotation of a select said fuel assembly when positioned thereat by said fuel transfer mechanism so as to operationally align said scan locus with said active scanner.

13. The identification system of claim 11 in which:
    said magnetic code components are formed of magnetic stainless steel; and
    said non-magnetic code components are formed of non-magnetic stainless steel.

14. The identification system of claim 11 in which said active scanner is mounted within said reactor core at said fuel storage region.

15. The identification system of claim 11 in which said active scanner is mounted upon said fuel transfer machine.

16. The identification system of claim 11 in which said code carrying region is located adjacent said engaging structure of each said fuel assembly.

17. The identification system of claim 11 in which:
    said active scanner magnetic core component comprises an E-shaped core having top, bottom and centrally disposed substantially parallel, vertically aligned and mutually spaced legs extending substantially equidistantly from a rearwardly disposed bar portion;
    said active scanner excitation winding is wound about said centrally disposed leg;
    said sensing component includes a first sensor winding wound about said bar portion intermediate said top and centrally disposed legs, and a second sensor winding wound about said bar portion intermediate said bottom and centrally disposed legs in a polar sense opposite to that of said first sensor winding.

18. The identification system of 17 in which:
    said magnetic code components are formed of magnetic stainless steel; and
    said non-magnetic code components are formed of non-magnetic stainless steel.

19. A method for identifying discrete fuel assemblies while located within the reactor vessel of a nuclear reactor and under the surface of a coolant medium retained therein, comprising the steps of:
    fixing a predetermined sequence of magnetic and non-magnetic code components to each said discrete fuel assembly at a code carrying region thereof which uniquely identify the fuel assembly to which they are affixed when scanned along a predetermined scan locus;
    providing an active scanner having a magnetic core component, an excitation winding energizable to generate electromagnetic flux within said core and a flux sensing component within said reactor vessel beneath said coolant medium surface;
    scanning said sequence of code components by energizing said excitation winding while effecting relative movement along said scan locus between said magnetic core component in adjacency with said sequence of code components; and
    deriving a sequence of signal outputs from said sensing component corresponding with the completion of a magnetic circuit between said magnetic core component and said magnetic code components and corresponding with said predetermined sequence of code components.

20. The method of claim 19 in which:
    said sequence of code components are located at an externally disposed said code carrying region; and
    said relative movement is carried out by moving said fuel assembly to a position wherein said code carrying region is adjacent said active sensor, following which said fuel assembly is rotated.

21. The method of claim 19 in which:
    said code carrying region is located at the surface of an internally disposed engaging channel positioned at the upwardly disposed end of said fuel assembly and said sequence of code components are arranged transversely to the axis of longitudinal extent of said fuel assembly; and
    said relative movement is carried out by inserting said active scanner through said engaging channel.

22. In a nuclear reactor wherein a fuel transfer machine having a grapple component is employed to engage a fuel assembly to carry out the maneuvering thereof and wherein a scanner is provided having an excitation coil for generating magnetic flux, the improved fuel assembly comprising:
    an elongate body portion retaining a plurality of fuel rods extending between upper and lower ends;
    an engaging structure coupled with said body portion at said upper end and engageable by said grapple component; and
    a predetermined code defining sequence of magnetic non-magnetic code components formed respectively of magnetic and non-magnetic materials fixed to said fuel assembly in the vicinity of said engaging structure at a code carrying region thereof and uniquely identifying said fuel assembly when said code carrying region is scanned along a predetermined scan locus by relative movement with respect to said active scanner in a manner wherein said magnetic code components effect completion of a magnetic circuit with said excitation coil generated magnetic flux.

23. The improved fuel assembly of claim 22 wherein said magnetic material is magnetic stainless steel.

24. The improved fuel assembly of claim 22 in which: said magnetic and non-magnetic code components are ring-shaped and mutually arranged to provide said code carrying region as a cylinder having an internal access channel extending therethrough for receiving said active scanner.

25. The improved fuel assembly of claim 22 in which said magnetic and non-magnetic code components are formed as bar segments of given lengthwise extent mutually arranged to provide said code carrying region as a cylinder having a cylinder axis, said lengthwise extent of each said code component being substantially parallel with said cylinder axis.

* * * * *